United States Patent
Müller et al.

(10) Patent No.: US 6,266,022 B1
(45) Date of Patent: Jul. 24, 2001

(54) DEVICE FOR DETERMINING THE FILLING LEVEL OF A FILLING MATERIAL IN A CONTAINER

(75) Inventors: Roland Müller, Steinen; Thomas Malzahn, Lörrach, both of (DE); Karl-Peter Hauptvogel, Bartenheim (FR); Dietmar Birgel, Schopfheim (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/497,022

(22) Filed: Feb. 2, 2000

(30) Foreign Application Priority Data

Sep. 7, 1999 (EP) .................................................. 99117604

(51) Int. Cl.$^7$ .................................................. G01R 29/08
(52) U.S. Cl. .................................. 343/703; 343/700 MS; 343/770; 342/124; 324/644
(58) Field of Search ........................... 343/700 MS, 703, 343/767, 769, 770; 342/124, 172; 324/636, 637, 644; G01R 29/08

(56) References Cited

U.S. PATENT DOCUMENTS

| | | | |
|---|---|---|---|
| 4,044,353 | * 8/1977 | Levy | 343/703 |
| 4,132,992 | * 1/1979 | Perrotti | 343/703 |
| 4,369,447 | 1/1983 | Edney | 343/769 |
| 4,665,403 | * 5/1987 | Edvardsson | 342/124 |
| 5,365,178 | * 11/1994 | Van Der Pol | 324/644 |
| 5,402,136 | 3/1995 | Goto et al. | 343/700 MS |
| 5,561,435 | 10/1996 | Nalbandian et al. | 343/700 MS |
| 5,689,265 | 11/1997 | Otto et al. | 342/124 |
| 5,818,391 | 10/1998 | Lee | 343/700 MS |
| 5,926,152 | * 7/1999 | Schneider | 343/915 |

FOREIGN PATENT DOCUMENTS

| | | |
|---|---|---|
| 19800306 | 7/1999 | (DE) . |
| 07212124 | 8/1995 | (JP) . |

* cited by examiner

*Primary Examiner*—T. Phan
(74) *Attorney, Agent, or Firm*—Bose McKinney & Evans LLP

(57) ABSTRACT

The invention relates to a device (1) for determining the filling level in a container (4). Moreover, the invention also relates to a method for fastening an input coupling unit (9) on the antenna (7), the antenna (7) being used in the device (1) according to the invention. It is the object of the invention to provide overvoltage protection for an antenna (7), and a method for producing such an antenna (7). The object is achieved by virtue of the fact that the antenna (7) comprises at least two dielectric layers (12, 13). The first dielectric layer (12) has at least one cutout (15) for holding the input coupling unit (9). The second dielectric layer (13) bears an antenna structure (16) on the side facing the first dielectric layer (12) and has a conductive coating (17) with openings (18) on the side averted from the first dielectric layer (12). Contacts (19) are provided in the second dielectric layer (13) and the conductive layer (17) which connect the input coupling unit (9) to the conductive coating (17). The region of space defined by the contacts (19), the conductive coating (17) and the antenna housing (30) forms a Faraday cage.

29 Claims, 4 Drawing Sheets

DEVICE FOR DETERMINING THE FILLING LEVEL OF A FILLING MATERIAL IN A CONTAINER

FIELD OF THE INVENTION

The invention relates to a device for determining the filling level of a filling material in a container. In particular, the invention relates to a device for determining the filling level in a container that provides effective overvoltage protection. The invention also relates to a method for fastening an input coupling unit to an antenna that can be used in the device according to the invention.

BACKGROUND OF THE INVENTION

It is preferred to use planar antennas to radiate a preferred wave mode. A planar antenna which can be used in connection with the device according to the invention is described in the book entitled "Einführung in die Theorie und Technik planarer Mikrowellenantennen in Mikrostreifenleitungstechnik" ("Introduction to the Theory and Technology of Planar Microwave Antennas in Microstrip Line Technology"), Gregor Gronau, Verlagsbuchhandlung Nellissen-Wolff or in the journal article "Impedance of a Radiating Slot in the Ground Plane of a Microstrip Line", IEEE Trans. Antennas Propagat., vol. AP-30, 922–926, May 1982.

A planar antenna comprises, for example, a dielectric substrate on one side of which the antenna structure is provided, and on the other side of which a conductive coating is provided. Openings are arranged in the conductive coating in such a way that the antenna radiates only electromagnetic waves of the desired mode.

Special protective measures are to be taken when the filling level meter is used in an area subject to explosion hazards. Here, it is imperative to ensure that overvoltages cannot be discharged through the explosive medium onto a neighboring surface at ground potential. Thus, in particular, no discharge spark may be allowed to jump over from the antenna onto the flange with the aid of which the filling level meter is fastened on the container. Overvoltages on the antenna are caused, for example, by a lightning strike.

A known protective measure provides that before it strikes the filling level meter an overvoltage is intercepted by an additional device, a so-called lightning protection system. This solution is, of course, relatively expensive. It has also become known to implement overvoltage protection in an electronic way.

SUMMARY OF THE INVENTION

It is the object of the invention to propose a cost effective overvoltage protection of high quality for a planar antenna, and to propose a method for fastening an input coupling unit on such an antenna.

The object is achieved with respect to the device by virtue of the fact that the antenna comprises at least two dielectric layers. The first dielectric layer has at least one cutout for holding the input coupling unit. The second dielectric layer bears an antenna structure on the side facing the first dielectric layer and has a conductive coating with openings on the side averted from the first dielectric layer. Contacts are provided in the second dielectric layer which connect the input coupling unit to the conductive coating. Furthermore, the region of space bounded by the contacts, the conductive coating and the antenna housing form a Faraday cage. The openings which are provided in the conductive coating are preferably of slot-shaped construction. The cutout in the first dielectric layer can be comprised of one or more through-connections or one or more openings.

In accordance with an advantageous development of the device according to the invention, the contacts are arranged in blind bores. The use of blind bores into which the contacts have been or will be introduced produces a very reliable, permanent connection and thus a high mechanical stability between the input coupling unit and the planar antenna.

In accordance with a first configuration of the device according to the invention, the blind bores have a conductive inner coating. This configuration permits the use of a radio-frequency connector, for example an SMA connector as the input coupling unit. In accordance with one configuration of the device according to the invention, the radio-frequency connector has a plurality of frame contact pins and at least one contact pin, arranged essentially centrally, for the inner conductor. It is usual to provide four contact pins which—seen in cross section—are arranged at the corners of a square, the contact pin for the inner conductor being located at the center of the square. The contact pins of the radio-frequency connector are inserted into the blind bores with the conductive inner coating, producing an electric connection to the conductive coating; the contact pin for the inner conductor is connected in a conductive fashion to the antenna structure. It is preferred to use the reflow method for the purpose of permanent electric connection between the input coupling unit and antenna structure or conductive coating. A preferred development of the device according to the invention provides, in addition, that the contact pin for the inner conductor of the input coupling unit, in particular of the radio-frequency connector (SMA connector), is shorter by at least the thickness of the first dielectric layer than the frame contact pins.

Furthermore, an advantageous development of the device according to the invention provides that the conductive coating is at ground potential through contact with the antenna housing and/or the connecting flange.

Thus, the conductive coating at ground potential with the preferably slot-shaped openings is provided in front of the inner conductor via which the measuring signals are fed from the signal-generating unit onto the antenna. Upon the occurrence of an overvoltage on the antenna, the discharge is conducted from the antenna structure onto the conductive coating, which is at ground potential. The discharge path is thus located completely within the antenna, and the discharge spark does not come into contact with the gas mixture of the area subject to explosion hazards.

The contacts are provided for the purpose of rendering redundant the diversion of the overvoltage from the conductive coating. Since the contacts do not penetrate the dielectric protective layer situated in front of the conductive coating, this also eliminates the otherwise customary soldered joints which are situated outside the protective layer and are relatively unstable chemically and must therefore be covered in principle by a further protective layer.

Since, moreover, the inner conductor does not penetrate the conductive coating connected to ground, no discharge spark can break through into the area subject to explosion hazards: the contacts, the antenna housing and the conductive coating form a Faraday cage.

In order to achieve optimum impedance matching between the input coupling unit and the antenna, the opening in the first dielectric layer, in which the input coupling unit is arranged, is filled up at least partially with a dielectric material. This dielectric material is selected to minimize the jump in impedance which usually occurs upon transition from one medium to another.

An advantageous development of the device according to the invention provides a dielectric protective layer which is connected to the second dielectric layer in such a way that the protective coating is arranged between the two dielectric layers. As the name already says, the layer protects the conductive coating situated therebelow against contamination and corrosion. The thickness of the conductive layer is preferably selected to provide protection against diffusion. The dielectric layers, in particular the protective layer, are preferably produced from Teflon. Thus, it is possible for the Teflon layer to be connected directly to the second dielectric layer, for example by means of optical laser welding. An additional adhesive layer is superfluous. The dielectric layers, in particular the first and second dielectric layer can, moreover, comprise a Teflon-ceramic composite or a Teflon-ceramic-glassfiber composite.

In accordance with an advantageous development of the device according to the invention, a funnel-shaped adapter is provided which connects the antenna to a second waveguide, in particular a wave tube. Either the adapter is produced from a conductive material, or it has at least one inner coating made from a conductive material. It has proved that it is also possible to achieve an optimum matching effect when the adapter is produced from a nonconductive material.

A preferred embodiment proposes to configure the adapter in such a way that it adapts an antenna with prescribed dimensions to the second waveguide, with prescribed dimensions, the dimensions of the antenna preferably being smaller than the dimensions of the second waveguide. It is thereby possible to match a standard antenna with a prescribed diameter to wave tubes of any dimension. Through the use of the adapter, the preferred propagation mode, which is generated by the antenna, is continuously widened to the diameter of the wave tube. Jumps do not occur.

In accordance with a development of the device according to the invention, antenna openings are provided which are essentially parallel to the direction of propagation of the wall currents of the TE01 mode of the measuring signals. The antenna openings suppress the propagation of undesired modes. The antenna openings are at least provided in a region of the lateral surface of the adapter which adjoins the antenna to the second wave guide. Whereas the wall currents of the TE01 mode move around the openings without difficulty, perpendicularly directed wall currents, and thus the corresponding modes, are suppressed. The openings are preferably of slot-shaped construction, but they can have any desired shape, in principle. Thus, it is also possible to achieve satisfactory results using arbitrarily shaped openings.

With reference to the method for fastening a radio-frequency input coupling unit, having at least one contact pin for the inner conductor and a plurality of contact pins, on an antenna, the object is achieved by means of the following features: blind bores are inserted into the second dielectric layer and the conductive coating; the contacts are introduced into the blind bores, as a result of which contact is made between the radio-frequency input coupling unit and the conductive coating; furthermore, the contact pin for the inner conductor of the radio-frequency input coupling unit makes contact with the antenna structure.

In accordance with a preferred embodiment of the method according to the invention, the contact pins and/or the inner conductor are connected to a conductive layer and/or the antenna structure by means of a reflow method.

In order to optimize the impedance matching between the input coupling unit and antenna, the cutout in the first dielectric layer, in which the input coupling unit is placed, is filled up with a dielectric material.

BRIEF DESCRIPTION OF THE DRAWINGS

The invention is explained in more detail below with the aid of the following drawings, in which.

DETAILED DESCRIPTION OF THE PREFERRED EMBODIMENTS

Figure 1:
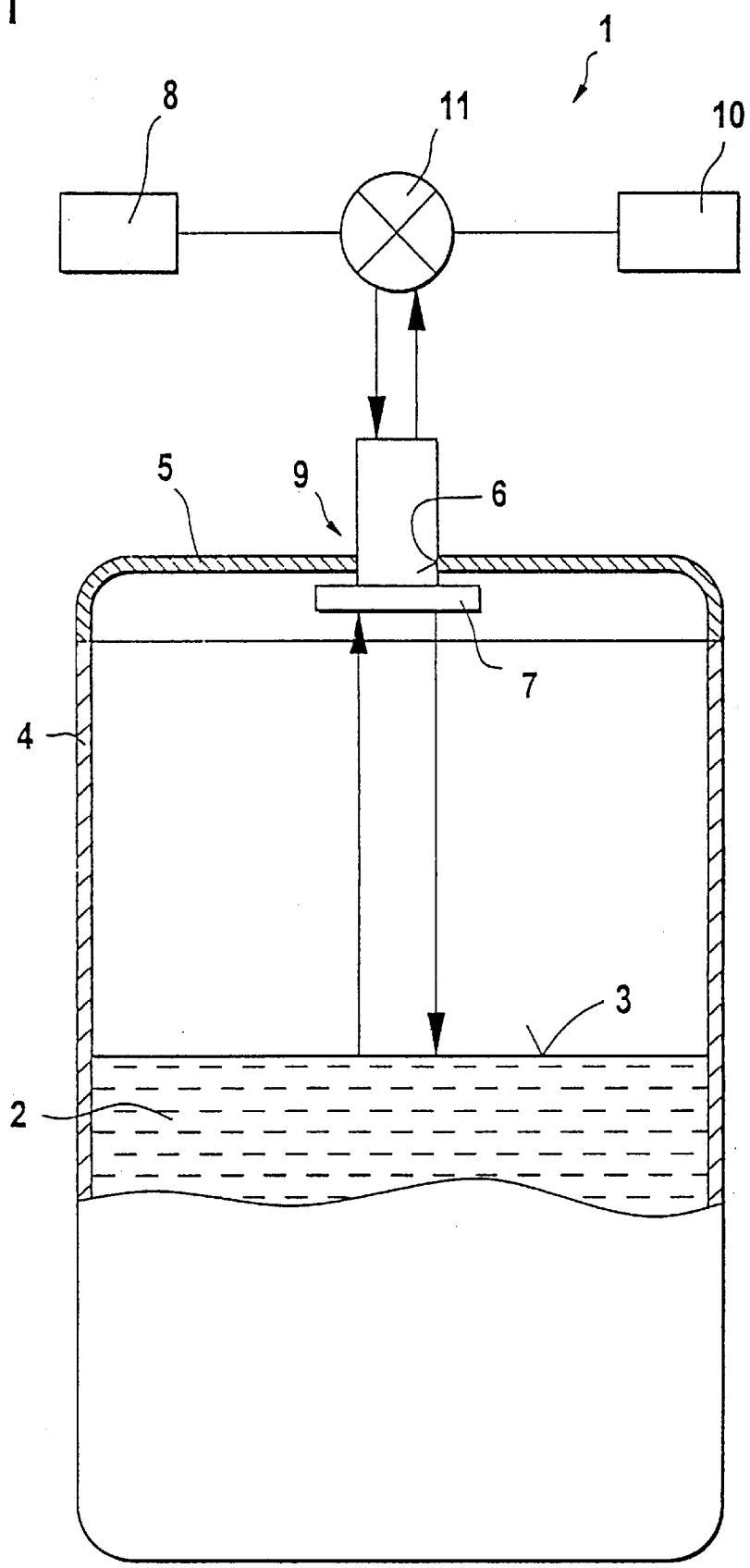
FIG. 1 shows a schematic of the device according to the invention.

FIG. 1 shows a schematic of an embodiment of the device according to the invention. A filling material 2 is stored in a container 4. The filling level meter 1, which is mounted in an opening 6 in the lid 5 of the container 4, serves to determine the filling level. Measuring signals, in particular microwaves, generated in the signal-generating unit 8 are radiated in the direction of the surface 3 of the filling material 2 via the antenna 7. The measuring signals are partially reflected as echo signals at the surface 3. These echo signals are received in the receiving/evaluating unit 10 and evaluated by means of a propagation time method. The correct timing of the dispatch of the measuring signals and reception of the echo signals is performed via the transmitting/receiving switch 11.

Figure 2:
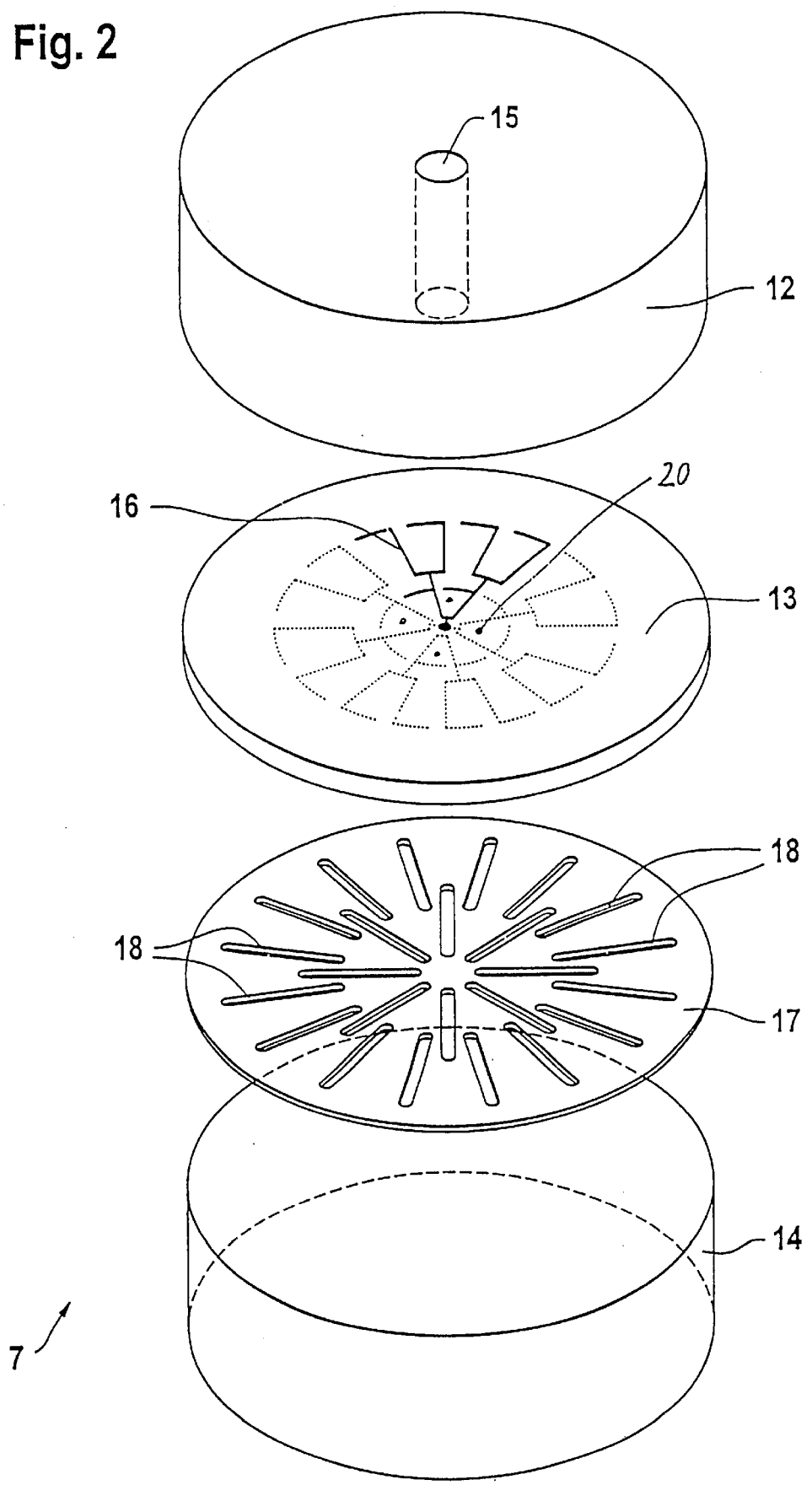
FIG. 2 shows an exploded representation of the individual layers of which the antenna is composed in accordance with a preferred embodiment.

FIG. 2 shows an exploded representation of the individual layers from which the antenna 7 is assembled. The antenna 7 comprises a first dielectric layer 12, a second dielectric layer 13 and a likewise dielectric protective layer 14. A cutout 15 for holding the input coupling unit 9 (not represented separately in FIG. 2) is provided centrally in the first dielectric layer 12. The second dielectric layer 13 bears an antenna structure 16, which is represented only in part, on the side facing the first dielectric layer 12. The second dielectric layer 13 is provided with a conductive coating 17 on the side facing the protective layer 14. The conductive coating 17 has radially arranged slot-shaped openings 18 which filter the preferred propagation mode from the measuring signals which are supplied by the signal generating unit 8. The individual layers 12, 13, 14, from which the displayed embodiment of the antenna 7 according to the invention is assembled, are held together, for example, via a bonded connection.

Figure 3:
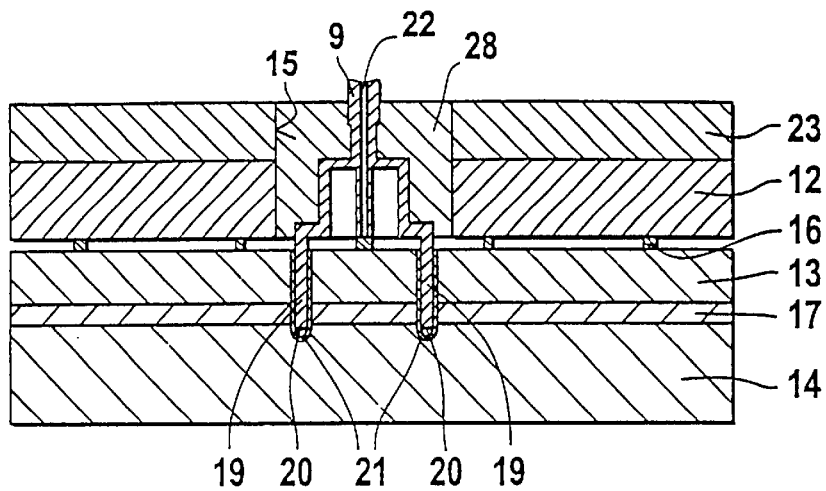
FIG. 3 shows a section through a preferred embodiment of the input coupling unit according to the invention, with antenna.
Figure 3A:
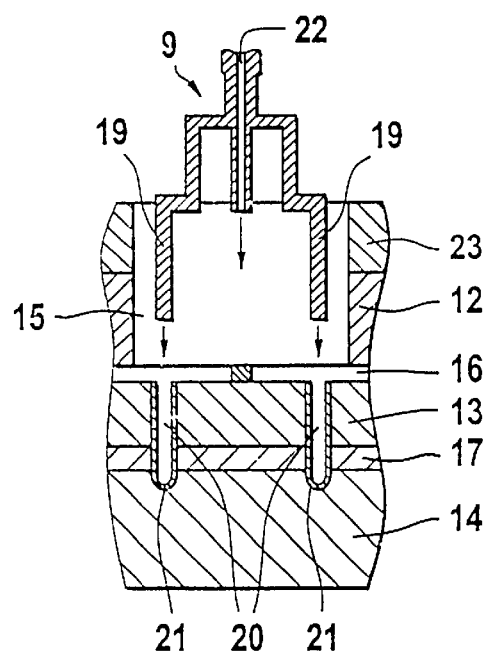
FIG. 3a shows the coupling unit being inserted into the antenna.

FIG. 3 shows a section through a preferred refinement of the input coupling unit 9 according to the invention, via which the measuring signals are fed onto the antenna 7. An enlarged representation of the coupling unit 9 being inserted into the antenna 7 is shown in FIG. 3a. It is clear from the section shown in FIG. 3c that the conductive coating 17 with the slot-shaped openings 18 over the antenna housing 30 and the flange 23 is at ground potential.

As in the case of the previously described embodiment, the antenna 7 is assembled from the first dielectric layer 12, the second dielectric layer 13 and the protective layer 14. The side, facing the first dielectric layer 12, of the second dielectric layer 13 bears the antenna structure 16; the conductive coating 17 with the openings 18 is arranged on the opposite side of the second dielectric layer 13. Also indicated is the flange 23, via which the conductive coating 17 is at frame potential.

If an overvoltage occurs on the antenna structure 16, discharging onto the conductive coating 17 takes place through the dielectric layer 13. A discharge in the upper section of the antenna 7 is ruled out, since the coax cable 31 guiding the measuring signals is insulated electrically from the conductive parts of the antenna housing as a consequence of the glass bushing 29.

In the case shown, the input coupling unit 9 is a radio-frequency connector, preferably an SMA connector. The contact pin for the inner conductor 22 makes electric contact with the antenna structure 16, while the frame contact pins 19 which are usually four contact pins 19 are inserted into the blind bores 20. The blind bores 20, which usually pass at least through the second dielectric layer 13 and the conductive coating 17 and terminate on or within the dielectric protective layer 14 are provided with a conductive inner coating 21. The frame contact pins 19 ensure that the diversion of the overvoltages from the antenna structure 16 can be performed in a redundant fashion. The connection of the contact pins 19 to the conductive coating 17, and the connection of the contact pin for the inner conductor 22 with the antenna structure 16 are preferably performed by means of a reflow method, as already mentioned at a previous juncture.

Figure 3B:
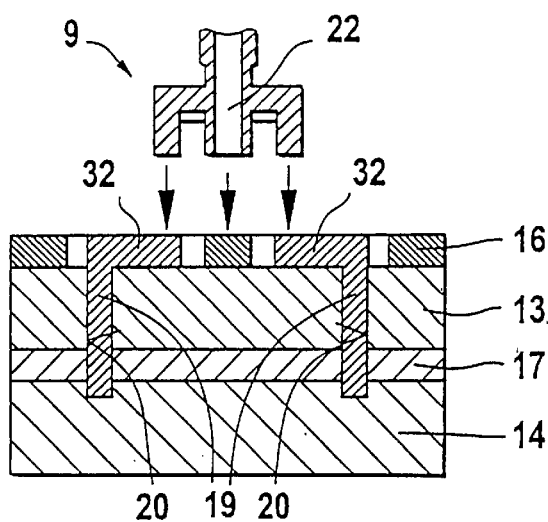
FIG. 3b shows an alternative embodiment of the electric contact shown in FIG. 3a, FIG. 3c shows a representation of the antenna with input coupling unit, mounted on a container.
Figure 3C:
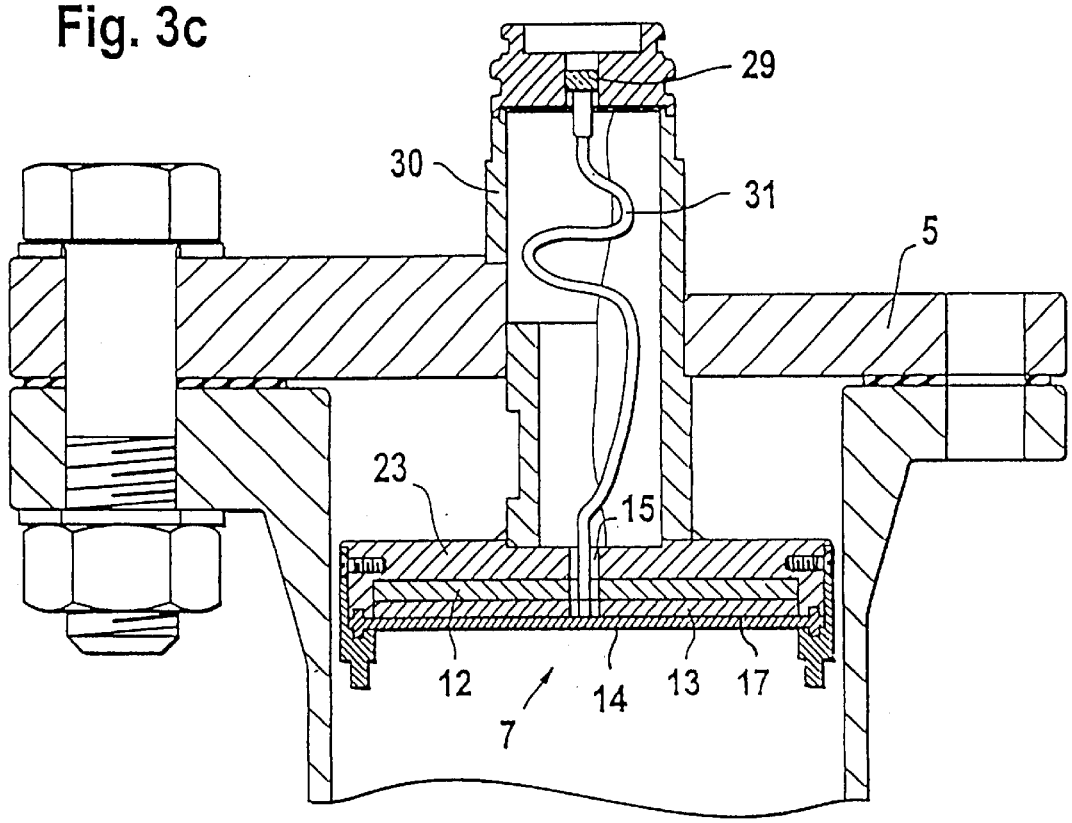

FIG. 3b shows an alternative embodiment to the radio-frequency connector 9 shown in FIG. 3a. An electrically conducting material is arranged in the blind bores 20 and connected to the contact pins 19 via conductor tracks 32. The electric contact, for example via the already previously mentioned reflow method, is made here in the immediate vicinity or on the surface of the second dielectric layer 13 or on the surface of the antenna structure 16.

Figure 4:
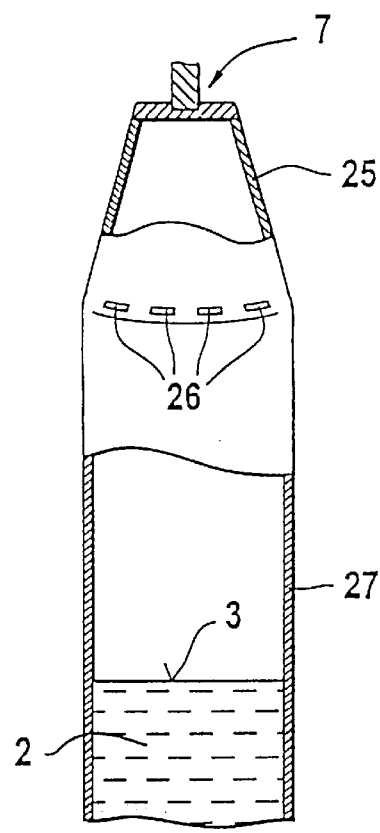
FIG. 4 shows a schematic of the adapter in accordance with a preferred embodiment of the device according to the invention.

FIG. 4 shows a schematic of the adapter 25 which renders it possible to adapt a standard antenna 7 of a prescribed size to a wave tube 27, which basically has any desired dimensions. In particular, the preferred mode adapter 25 can be continuously widened to any desired diameter of the wave tube 27. Openings 26 are provided in the lateral surface of the adapter 25 in the border region between the adapter 25 and wave tube 27. In the case shown, the openings are of slot-shaped configuration. In principle, however, they can have any desired form. The openings 26 suppress modes whose wall currents are oriented perpendicular to the direction of propagation of the measurement signals, and therefore they do not disturb the preferred TE01 mode. This TE01 mode can also continue to propagate without restriction, since the wall currents move around the openings 26. Consequently, the adapter 25 according to the invention permits the use of an antenna 7 which generates and radiates any desired mode.

We claim:

1. A device for determining the filling level of a filling material (2) in a container (4), comprising:

a signal-generating unit (8) which generates measuring signals, an antenna (7) with an antenna housing (30), an input coupling unit (9) which couples the measuring signals onto the antenna (7), and the antenna (7) emitting the measuring signals in the direction of the surface of the filling material (2), and a receiving/evaluating circuit (10) which receives the measuring signals reflected at the surface (3) of the filling material (2) and determines the filling level in the container (4) via the propagation time of the measuring signals, wherein the antenna (7) comprises at least a first dielectric layer and a second dielectric layer (12, 13), the first dielectric layer (12) having at least one cutout (15) for holding the input coupling unit (9), the second dielectric layer (13) bearing an antenna structure (16) on the side facing the first dielectric layer (12), and having a conductive coating (17) with openings (18) on the side averted from the first dielectric layer (12), wherein contacts (19) are provided in the second dielectric layer (13) which connect the input coupling unit (9) to the conductive coating (17), and wherein the spatial region defined by the contacts (19), the conductive coating (17) and the antenna housing (30) forms a Faraday cage.

2. The device as claimed in claim 1, wherein the contacts (19) are arranged in blind bores (20).

3. The device as claimed in claim 2, wherein the conductive coating (17) with the openings (18) is at frame potential.

4. The device as claimed in claim 2, wherein the input coupling unit (9) is a radio-frequency connector (9a) which includes the contacts (19) and at least one inner conductor (22) arranged essentially centrally.

5. The device as claimed in claim 2, wherein the blind bores (20) have a conductive inner coating (21).

6. The device as claimed in claim 5, wherein the input coupling unit (9) is a radio-frequency connector (9a) which includes the contacts (19) and at least one inner conductor (22) arranged essentially centrally.

7. The device as claimed in claim 6, wherein the inner conductor (22) is shorter at least by the layer thickness of the first dielectric layer (12) than the contacts (19), and wherein the inner conductor (22) can be connected to the antenna structure (16).

8. The device as claimed in claim 2, wherein the input coupling unit (9) is connected to the conductive coating (17) via the contacts (19).

9. The device as claimed in claim 7, wherein the cutout (15) in the first dielectric layer (12), in which the input coupling unit (9) is arranged, is filled up at least partially with a dielectric material (28).

10. The device as claimed in claim 1, wherein the conductive coating (17) with the openings (18) is at frame potential.

11. The device as claimed in claim 10, wherein the input coupling unit (9) is a radio-frequency connector (9a) which includes the contacts (19) and at least one inner conductor (22) arranged essentially centrally.

12. The device as claimed in claim 1, wherein the input coupling unit (9) is a radio-frequency connector (9a) which includes the contacts (19) and at least one inner conductor (22) arranged essentially centrally.

13. The device as claimed in claim 12, wherein the cutout (15) in the first dielectric layer (12), in which the input coupling unit (9) is arranged, is filled up at least partially with a dielectric material (28).

14. The device as claimed in claim 12, wherein the inner conductor (22) is shorter at least by the layer thickness of the first dielectric layer (12) than the contacts (19), and wherein the inner conductor (22) can be connected to the antenna structure (16).

15. The device as claimed in claim 14, wherein the cutout (15) in the first dielectric layer (12), in which the input coupling unit (9) is arranged, is filled up at least partially with a dielectric material (28).

16. The device as claimed in claim 14, further comprising a dielectric protective layer (14) which is connected to the second dielectric layer (13) on the side on which the conductive coating (17) is arranged.

17. The device as claimed in claim 16, wherein the dielectric layers (12, 13, 14) are made from Teflon.

18. The device as claimed in claim 1, wherein the cutout (15) in the first dielectric layer (12), in which the input coupling unit (9) is arranged, is filled up at least partially with a dielectric material (28).

19. The device as claimed in claim 18, further comprising a dielectric protective layer (14) which is connected to the second dielectric layer (13) on the side on which the conductive coating (17) is arranged.

20. The device as claimed in claim 19, wherein the dielectric layers (12, 13, 14) are made from Teflon.

21. The device as claimed in claim 1, further comprising a dielectric protective layer (14) which is connected to the second dielectric layer (13) on the side on which the conductive coating (17) is arranged.

22. The device as claimed in claim 21, wherein the dielectric layers (12, 13, 14) are made from Teflon.

23. The device as claimed in claim 1, wherein the dielectric layers (12, 13) are made from Teflon.

24. The device as claimed in claim 1, further comprising a funnel-shaped adapter (25) and a second waveguide (27), the funnel-shaped adapter (25) connecting the antenna (7) to the second waveguide (27).

25. The device as claimed in claim 24, wherein the adapter (25) is configured in such a way that it adapts an antenna (7) with prescribed dimensions to the second waveguide (27) with prescribed dimensions, the dimensions of the antenna (7) being smaller than the dimensions of the second waveguide (27).

26. The device as claimed in claim 24, wherein, at least in a region of the lateral surface of the adapter (25) which adjoins the antenna (7), openings (26) are provided which are essentially parallel to the direction of propagation of the wall currents of the TE01 mode of the measuring signals.

27. A method for fastening an input coupling unit (9), having at least one inner conductor (22), to an antenna (7) which is used to determine the filling level of a filling material (2) in a container (4), the method comprising the steps of:

forming a first dielectric layer (12) with at least one cutout (15) for holding the input coupling unit (9) with at least one inner conductor (22), forming a second dielectric layer (13) having a first side and a second side, making an antenna structure (16) on the first side of the second dielectric layer (13), making a conductive coating (17) with openings (18) on the second side of the second dielectric layer (13), placing the first dielectric layer (12) against the second dielectric layer (13) such that the antenna structure (16) faces the first dielectric layer (12) and the conductive coating (17) faces away from the first dielectric layer (12), inserting blind bores into the second dielectric layer (13) and the conductive coating (17), introducing contacts (19) into the blind bores (20), with the result that the input coupling unit (9) makes contact with the conductive coating (17), and the inner conductor (22) makes contact with the antenna structure (16).

28. The method as claimed in claim 27, wherein the contacts (19) are contact pins which are fitted to the input coupling unit (9), and wherein the contact pins (19) with the conductive coating (17) and the inner conductor (22) are connected to the antenna structure (16) by means of a reflow method.

29. The method as claimed in claim 27, further comprising the step of filling the cutout (15) in the first dielectric layer (12), in which the input coupling unit (9) is placed, with a dielectric material (28).

* * * * *